US007975058B2

(12) United States Patent
Okmianski et al.

(10) Patent No.: US 7,975,058 B2
(45) Date of Patent: Jul. 5, 2011

(54) SYSTEMS AND METHODS FOR REMOTE ACCESS OF NETWORK DEVICES HAVING PRIVATE ADDRESSES

(75) Inventors: Anton Okmianski, Lincoln, MA (US); Mickael Graham, Lincoln, MA (US); Joshua B. Littlefield, Wellesley, MA (US); Allen J. Huotari, Garden Grove, CA (US)

(73) Assignee: Cisco Technology, Inc., San Jose, CA (US)

( * ) Notice: Subject to any disclaimer, the term of this patent is extended or adjusted under 35 U.S.C. 154(b) by 1040 days.

(21) Appl. No.: 11/343,414

(22) Filed: Jan. 31, 2006

(65) Prior Publication Data
US 2007/0180081 A1   Aug. 2, 2007

(51) Int. Cl.
G06F 15/16 (2006.01)
H04L 12/28 (2006.01)
(52) U.S. Cl. ........................ 709/229; 370/389
(58) Field of Classification Search .................. 709/229; 370/389
See application file for complete search history.

(56) References Cited

U.S. PATENT DOCUMENTS

| 7,620,707 | B1* | 11/2009 | Sutherland et al. | 709/223 |
| 7,640,580 | B1* | 12/2009 | Plotnikov et al. | 726/12 |
| 2003/0106067 | A1 | 6/2003 | Hoskins et al. | |
| 2004/0249911 | A1* | 12/2004 | Alkhatib et al. | 709/223 |
| 2005/0044232 | A1* | 2/2005 | Keane | 709/227 |
| 2005/0201370 | A1* | 9/2005 | Poyhonen et al. | 370/389 |

OTHER PUBLICATIONS

J. Rosenberg et al., "STUN—Simple Traversal of User Datagram Protocol (UDP) Through Network Address Translators (NATs)", Network Working Group 3489, pp. 1-37, Mar. 2003.
J. Rosenberg et al., "Draft-ietf-behave-rfc3489bis-01, Simple traversal of UDP Through Network Address Translators (NAT) . . . ", BEHAVE internet draft, pp. 1-41, Feb. 21, 2005.
J. Rosenberg et al., "Draft-rosenberg-midcom-turn-07, Traversal Using Relay NAT (TURN)", MIDCOM Internet Draft, pp. 1-29, Feb. 21, 2005.
J. Rosenberg et al., "Draft-ietf-mmusic-ice-04, Interactive Connectivity Establishment (ICE): A Method for Network Address . . . ", MMUSIC Internet-draft, pp. 1-41, Feb. 21, 2005.
DSLHOME-Technical Working Group, "Applying TR-069 to Remote Management of Home Networking Devices", Technical Report DSL Forum TR-111, pp. 1-29, Dec. 2005.
Mahajan, Ratul et al., Understanding BGP Misconfiguration, Proceedings of the 2002 Conf. on Applications, Technologies, Architectures, and Protocols for Computer Communications, 2002, pp. 3-16, available on the Internet at cs.wm.edu/~hnw/courses/cs780/papers/sigcomm2002-misconfigs.pdf.

\* cited by examiner

Primary Examiner — Nathan Flynn
Assistant Examiner — Nicholas Jensen
(74) Attorney, Agent, or Firm — Haynes and Boone, LLP (57) ABSTRACT

A proxy server according to an embodiment includes a memory and a communication unit. The memory is configured to store and retrieve a client device identifier and an associated client device transport address, while the communication unit is configured to send and receive messages. The communication unit is configured to receive an identification message according to a first protocol from a client device through at least one intermediate network address translator (NAT). The identification message includes the client device identifier and conveys the client device transport address. The communication unit is configured to receive a request message from an admin device including the client device identifier. The proxy server is configured to retrieve the associated client device transport address and instruct the client device to open a connection with the proxy server according to a second protocol that is different from the first protocol.

39 Claims, 7 Drawing Sheets

SYSTEMS AND METHODS FOR REMOTE ACCESS OF NETWORK DEVICES HAVING PRIVATE ADDRESSES

TECHNICAL FIELD

This invention relates generally to diagnosis of network problems, and more particularly, for example, to systems and methods for remote troubleshooting of network devices having private Internet Protocol (IP) addressing.

BACKGROUND

Internet-based service providers (ISPs) are beginning to offer more services to subscribers utilizing network devices deployed behind gateways, such as a home gateway, in subscriber's networks. Voice Over Internet Protocol (VoIP) services, in particular, are gaining momentum, while video-over-IP services such as video conferencing and video-on-demand are expected to follow. These new services are often delivered using the subscriber's existing broadband connection. This deployment option opened up an opportunity for a new breed of independent service providers to enter the market and compete with established access providers. The competition is expected to heat up and is forcing service providers to look for very cost efficient options for rolling out and managing these services.

The process of configuring a network device and establishing service is known as provisioning. Some provisioning systems are used to automatically configure devices using a variety of configuration protocols such as Data Over Cable Service Interface Specification (DOCSIS), the PacketCable interface specification, the Customer Premises Equipment (CPE) Wide Area Network (WAN) management protocol according to Technical Report TR-069, and eXtensible Markup Language (XML) Configuration Access Protocol (XCAP), for example. However, once the device is configured, a user may wish to customize certain settings for their environment. For example, some VoIP devices come with a built-in wireless gateway and consumers may wish to setup local wireless network security. If the user encounters difficulties in the customization of their device and/or Local Area Network (LAN) settings, they may seek assistance from their service provider. Instead of building sophisticated automated subscriber support systems, some service providers opt for a more direct solution that relies on remotely accessing a subscriber device's configuration user interface (UI) by support personnel. Many devices provide a web-based UI intended for local access by the subscriber and remote access by the service provider.

Troubleshooting using remote access to subscriber device's UI is not the only mechanism for remote troubleshooting and assistance, but it has been utilized by some service providers that find its simplicity appealing. In the past and presently, this model is used for remote troubleshooting of home gateways with public Internet Protocol (IP) connectivity. More recently, these service providers have expressed desire to extend this support model to devices deployed behind the home gateway which often have private local IP address assigned by the DHCP server in the home gateway.

Devices behind a home gateway are typically shielded from remote entities initiating connections to them by virtue of the home gateway functioning as a firewall and network address translation (NAT) router. In this environment, it becomes impossible for service providers to use the device UI remotely because (a) the device IP address is not known and (b) there is no standard mechanism to initiate a remote HTTP connection to a NAT'ed device. Therefore, there remains a need in the art for systems and methods that address the problems of accessing a client device that has a private address.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Devices, methods and systems are disclosed herein, in accordance with one or more embodiments of the present invention, that provide remote administration or device management for client devices with private or local IP addresses, including those connected to a network behind a firewall, Network Address Translation (NAT) router, or a gateway, where a gateway may be considered generally as any network traffic router which connects two networks. According to one or more embodiments of the present invention, the first part of the present invention involves establishing a communication connection between a client device with a private address and a proxy server, while the second part of the present invention involves establishing relay communications from an administrator device, or admin device, to the client device through the proxy server. The client device is separated from the admin device by at least one intermediate NAT so that only the client device can initiate the communication connection. Once the relay communications of the remote access system are established, an administrator may perform remote administration or troubleshooting of the client device and diagnosis of network problems. An administrator is enabled to access a client device troubleshooting User Interface (UI) using a proxy in spite of the client device having a private IP address due to the presence of an intermediate NAT. The client device may maintain a path through the NAT where the path is used by the proxy server to instruct the client device to establish a connection when it is needed. Once the connection is established, the proxy server may then relay message traffic, such as HyperText Transfer Protocol (HTTP) traffic, between an admin device user interface and the client device.

Private networks, or networks having devices with private addresses, are common and may be used where an organization does not require globally unique addresses for every network device or where there is a shortage of available addresses. In addition, private addressing provides a basic form of security since it is not possible for an external device outside the private network to initiate a direct connection to a device on the private network, since the private network address is not known to the external device. In this manner, the client device on a private network may have an address that is either not known to or is not directly accessible from an outside network. This is one example of a type of barrier that a NAT gateway, router, or firewall can create. NATs may be used anywhere within a network hierarchy, and not merely on the boundary between public and private networks.

Figure 1:
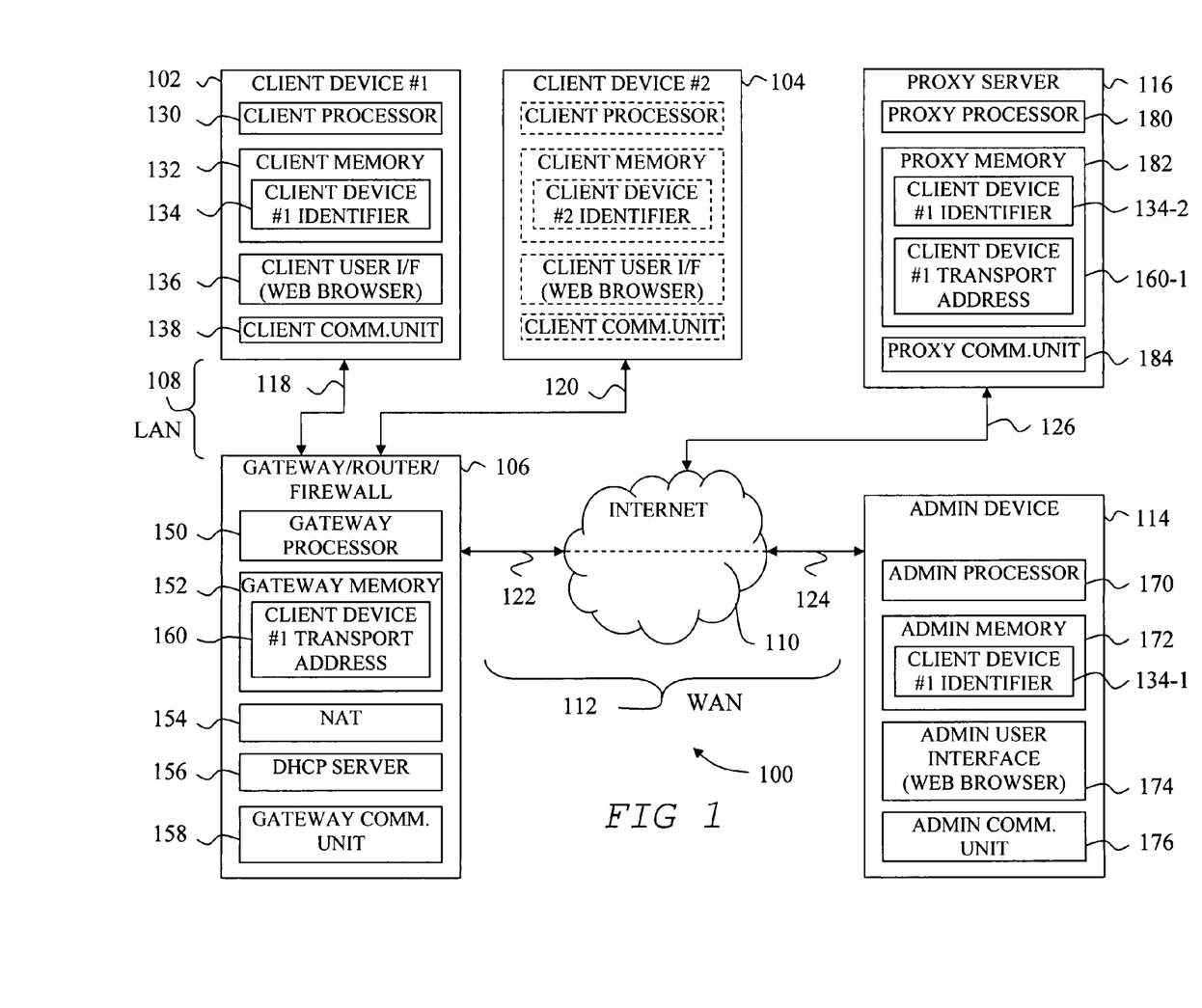
FIG. 1 shows an exemplary remote access system, according to an embodiment of the present invention.

FIG. 1 shows an exemplary remote access system 100, according to an embodiment of the present invention. System 100 may include a first client device 102 and/or a second client device 104 connected to a gateway, router, or firewall device 106 comprising a first network 108, also described as a private Local Area Network (LAN) 108, where the network addresses of devices on LAN 108 are not known or visible beyond gateway 106. Gateway device 106, henceforth gateway 106, provides network connectivity between devices connected to first network 108 at a lower level of hierarchy and devices connected to a second network 110 such as the Internet on a higher level of hierarchy comprising a Wide Area Network (WAN) 112. An administrator network device 114, hereinafter admin device 114, and a proxy server 116 may also be connected to second network 110 and/or be included in WAN 112. Thus, system 100 may include a plurality of network devices connected to a plurality of networks, where at least one network has addresses that are not known to or directly accessible from another network. Further, system 100 may include multiple levels of network hierarchy, where the networks are interconnected through one or more gateways, such as gateway 106. System 100 may include a plurality of NATs for translating addresses at the interconnection point between adjacent networks.

First client device 102, henceforth device 102, and second client device 104, henceforth device 104, may each be any network device including a computer, a user terminal, a router, a gateway, a hub, an access point, a Voice Over Internet Protocol (VoIP) telephone, a television set-top decoder box, or other device for use with a service provider. Device 102 and device 104 may each be considered Customer Premises Equipment (CPE) since they typically are present at a customer work-site, business, or home and are leased or owned by the customer. Device 102 communicates with gateway 106 through a channel 118 that can be a wired or a wireless connection for passing messages according to a network protocol such as the Transfer Control Protocol/Internet Protocol (TCP/IP), where messages are routed on the network based on sender and receiver addresses. Similarly, device 104 communicates with gateway 106 through a channel 120 that can also be a wired or a wireless connection for passing messages according to a network protocol. Although in this exemplary embodiment LAN 108 includes only three devices in a star network topology, this is not considered limiting since a number of different network topologies and a larger or smaller number of network devices may comprise LAN 108. Gateway 106 communicates with second network 110 through a channel 122 that can be a wired or a wireless connection for passing messages according to a network protocol. Admin device 114 communicates with second network 110 through a channel 124 that can be a wired or a wireless connection for passing messages according to a network protocol. Similarly, proxy server 116 communicates with the second network 110 through a channel 126

Device 102 may include a suitably programmed client processor 130 configured to execute computer instructions, a client memory 132 configured to store and retrieve information including a client device identifier 134, a client user interface 136 configured to receive data from and present data to a client user and provide an administrative user interface for device 102, and/or a client communication unit 138 configured to send and receive messages on channel 118. Client memory 132 may include a Random Access Memory (RAM), a disc memory, an optical memory, a magnetic memory device, a register file, and/or any technology for storing and retrieving information for use by client processor 130 or any device 102 resource. Further, client memory 132 may be removable from device 102 to provide for safekeeping of the stored information, ease of maintenance, and/or re-configurability. Client device identifier 134 may be a serial or identification number, comprising a text string of alpha and/or numeric characters, a user selected text string, an administrator selected text string, or some other information used to identify client device 102. Similarly, device 104 may also include a client processor, a client memory, a client device identifier, a client user interface, and/or a client communication unit configured to send and receive messages on channel 120.

Client user interface 136 can be a web browser or other communication program running on client processor 130 or another processor. Alternatively, client user interface 136 may be a device or method used to communicate over LAN 108 from device 102, and/or provide an administrator user interface from which a user or an administrator may change, configure, and/or provision a service associated with a service provider for device 102 or a connected resource, including the service through which device 102 operates. Although an administrator may be a person such as a customer support representative from a service provider, the administrator may alternatively be an autonomous client program or diagnostic program executing on admin device 114 such as a troubleshooting script tailored for or adapted for use with device 102. Client communication unit 138 can include hardware and/or software for use in sending and receiving messages on channel 118, where the messages may be routed to or from any network resource.

Gateway 106 may include a suitably programmed gateway processor 150 configured to execute computer instructions, a gateway memory 152 configured to store and retrieve information, a network address translator (NAT) 154 configured to allow the use of one set of external network address and one set of local network addresses which are not necessarily globally unique, a dynamic host configuration protocol (DHCP) server 156 configured to dynamically assign local network address, a gateway communication unit 158 configured to send and receive messages on LAN 108 over channels 118 and 120, and/or send and receive messages on WAN 112 over channel 122. NAT 154 provides a translation or mapping of address on LAN 108 to addresses on WAN 112 enabling local traffic on LAN 108 to use one set of network addresses and external traffic on WAN 112 to use another set of network addresses, where the network addresses on LAN 108 are not necessarily globally unique. Finally, DHCP server 156 dynamically assigns network addresses to network devices connected to LAN 108. These addresses may be assigned upon request and expire automatically if address lease is not renewed after a predetermined period of time has expired.

Gateway memory 152 may include a Random Access Memory (RAM), a disc memory, an optical memory, a magnetic memory device, a register file, and/or any technology for storing and retrieving information for use by gateway processor 150 or any gateway 106 resource, including NAT 154, DHCP server 156, and/or gateway communication unit 158. Further, gateway memory 152 may be removable from device 102 to provide for safekeeping of the stored information, ease of maintenance, and/or re-configurability.

Client communication unit 138 may be dynamically or statically assigned a network client transport address 160 comprising a network address and/or a port address, for example. The network address can be an Internet Protocol (IP) address comprising the familiar series of address field octets, or may be a name resolved into octets. Gateway memory 152 may store and retrieve the client device transport address 160 and port comprising the network address of the client 102 on LAN 108. To avoid collisions, each network address is unique for devices on a particular LAN, such as LAN 108. A port is an endpoint to a logical connection and is usually specified by a number to designate the kind of server or protocol to which the network message traffic applies. Some port numbers are well known by convention where, for example, port 80 designates Hypertext Transfer Protocol (HTTP) traffic, and port 443 designates HTTP Secure (HTTPS) traffic as described in the Internet Engineering Task Force (IETF) Request for Comments (RFC) document 1700, also referred to as IETF-RFC1700. The LAN 108 client device transport address 160 for device 102 is locally assigned by a DHCP server 156 in gateway 106 and is not typically visible on second network 110. The NAT 154 assigns a mapping between a local address:port combination to an external address:port combination for a period of time which may be updated if message traffic flows through the mapped address:port combination pair. System 100 may include an extensive hierarchy of networks where client device 102 and proxy server 116 may be separated by a plurality of NATs for translating addresses at the interconnection point between adjacent networks.

Admin device 114 may include a suitably programmed admin processor 170 configured to execute computer instructions, an admin memory 172 configured to store and retrieve information including network addresses and client device identifier 134-1, an admin user interface 174, such as a web browser, configured to receive data from and present data to an admin user, and/or an admin communication unit 176 configured to send and receive messages on channel 124 onto WAN 112. Admin memory 172 may include a Random Access Memory (RAM), a disc memory, an optical memory, a magnetic memory device, a register file, and/or any technology for storing and retrieving information for use by client processor 170 or any admin device 114 resource. Further, admin memory 172 may be removable from admin device 114 to provide for safekeeping of the stored information, ease of maintenance, and/or re-configurability.

Proxy server 116 may include a suitably programmed proxy processor 180 configured to execute computer instructions and a proxy memory 182 configured to store and retrieve information including a client device identifier 134-2 and a client device network address 160-1. Proxy server 116 may also include a proxy communication unit 184 configured to send and receive messages on channel 126 onto WAN 112. According to one or more embodiments of the present invention, proxy server 116 may be configured to (a) maintain network connectivity with devices using a light-weight protocol, (b) coordinate the establishment of TCP connections, and (c) relay traffic between an administrator and client device. It is not necessary that the router function in gateway 106 cooperate with proxy server 116 to accomplish these capabilities since they operate independently. Proxy memory 182 may include a Random Access Memory (RAM), a disc memory, an optical memory, a magnetic memory device, a register file, and/or any technology for storing and retrieving information for use by proxy processor 180 or any proxy server 116 resource. Further, proxy memory 182 may be removable from proxy server 116 to provide for safekeeping of the stored information, ease of maintenance, and/or re-configurability.

As will be more fully described below, one or more embodiments of the present invention provide remote access by an administrator on an external network to the administrative user interface (UI) of a client device on a private network through a smart HTTP proxy and private device functionality that work together in unison to provide access to the client device. A private network may be a local area network or network hierarchy located behind a firewall or a NAT router such as a home gateway or a restricted business network.

Figure 2:
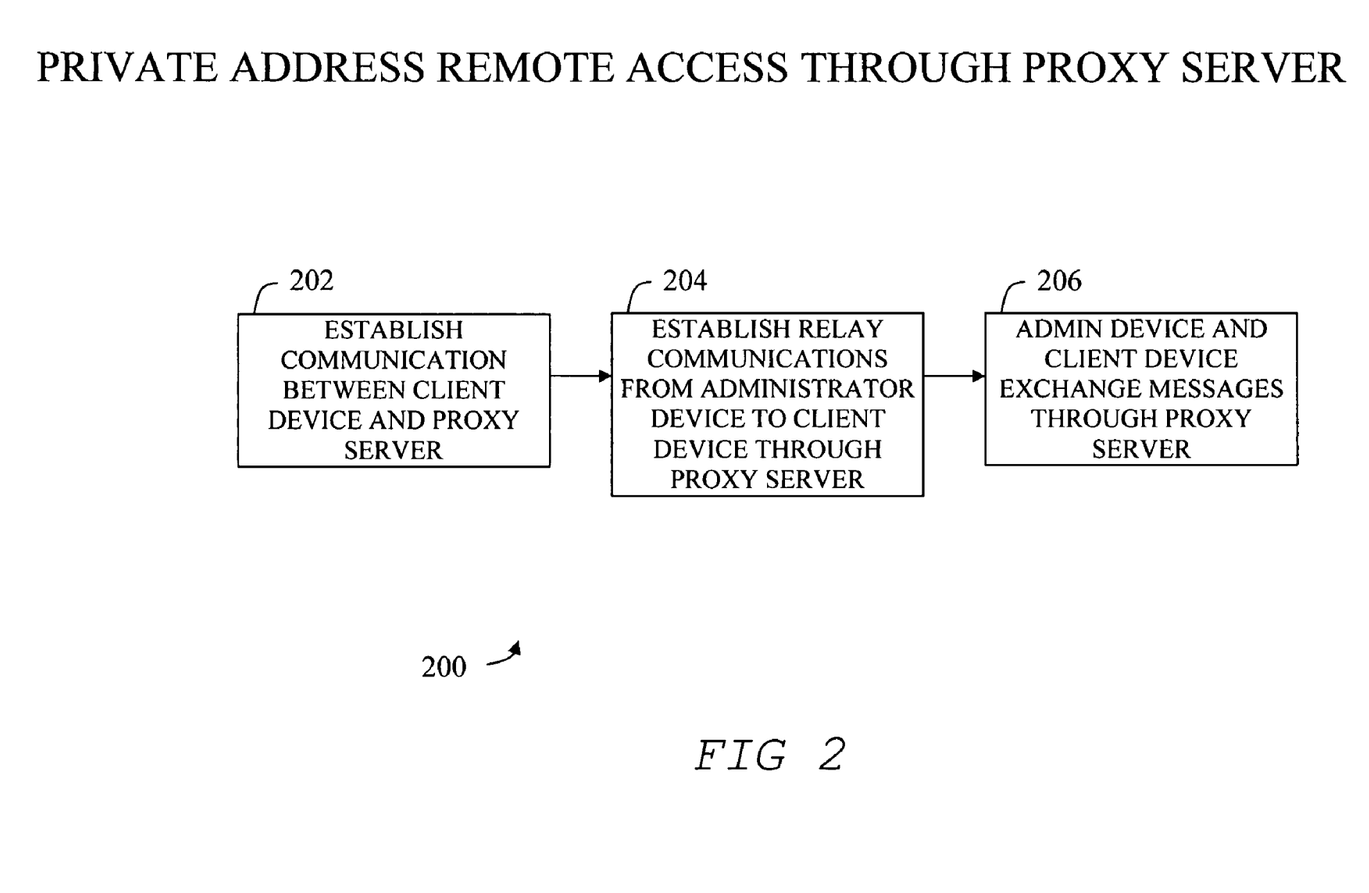
FIG. 2 shows an exemplary process flow for providing private Internet Protocol (IP) address remote access through a proxy server, according to an embodiment of the present invention.

FIG. 2 shows an exemplary process flow 200 for providing private address remote access through a proxy server, according to an embodiment of the present invention. In reference to FIGS. 1 and 2, flow 200 may include establishing communications between a client device 102 and a proxy server 116 in operation 202, establishing relay communications from admin device 114 to client device 102 through proxy server 116 in operation 204, and/or exchanging messages between admin 114 device and client device 102 through proxy server 116 in operation 206. The communication channel established in operation 202 may use a connectionless protocol such as the User Datagram Protocol (UDP).

Figure 3:
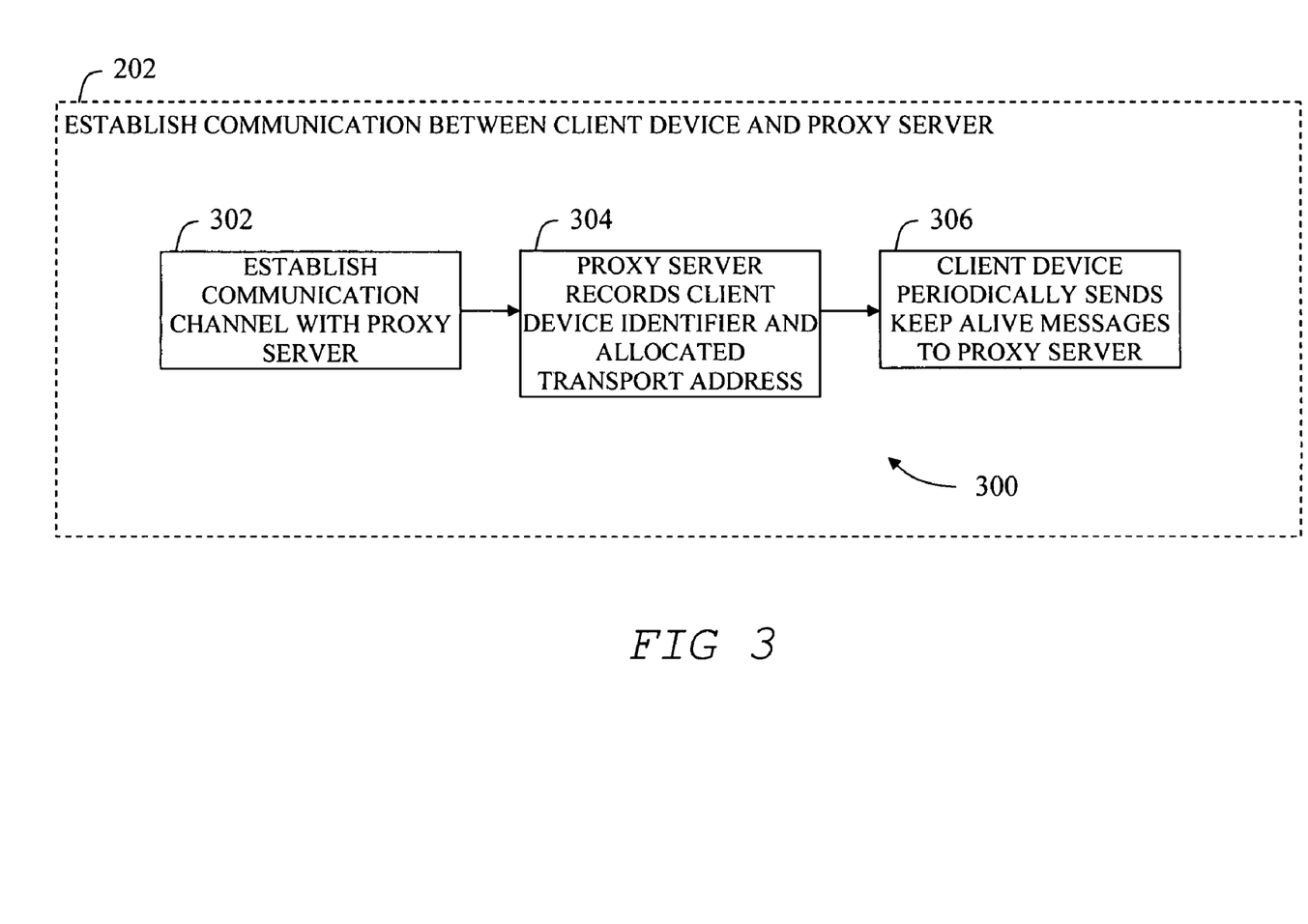
FIG. 3 shows a detailed exemplary process flow for establishing communication between a client device and a proxy server, according to an embodiment of the present invention.

FIG. 3 shows a detailed exemplary process flow 300 for establishing communication between a client device and a proxy server, according to an embodiment of the present invention. Flow 300 corresponds to at least one embodiment of operation 202 in FIG. 2. In reference to FIGS. 1-3, flow 300 includes establishing a communication channel between device 102 and proxy server 116 in operation 302. Operation 302 may use a connectionless communications protocol, such as UDP. In operation 302, device 102 provides device identifier 134 to proxy server 116. Conversely stated, device identifier 134 sent by device 102 is received at proxy server 116. Device 102 may be authenticated to proxy server 116 using a variety of mechanisms including message digests utilizing a pre-shared secret or public certificate. Flow 300 continues with operation 304 where proxy server 116 records client device identifier 134 and the source transport address 140 allocated to the device by the NAT router 154, where the source IP address and/or port are retrieved from the IP packet header. Flow 300 concludes with operation 306 where device 102 periodically sends UDP keep-alive messages to maintain the NAT address binding in gateway 106 so that proxy server 116 can send messages back to device 102 when needed. Conversely stated, proxy server 116 periodically receives keep-alive messages sent by device 102.

Figure 4:
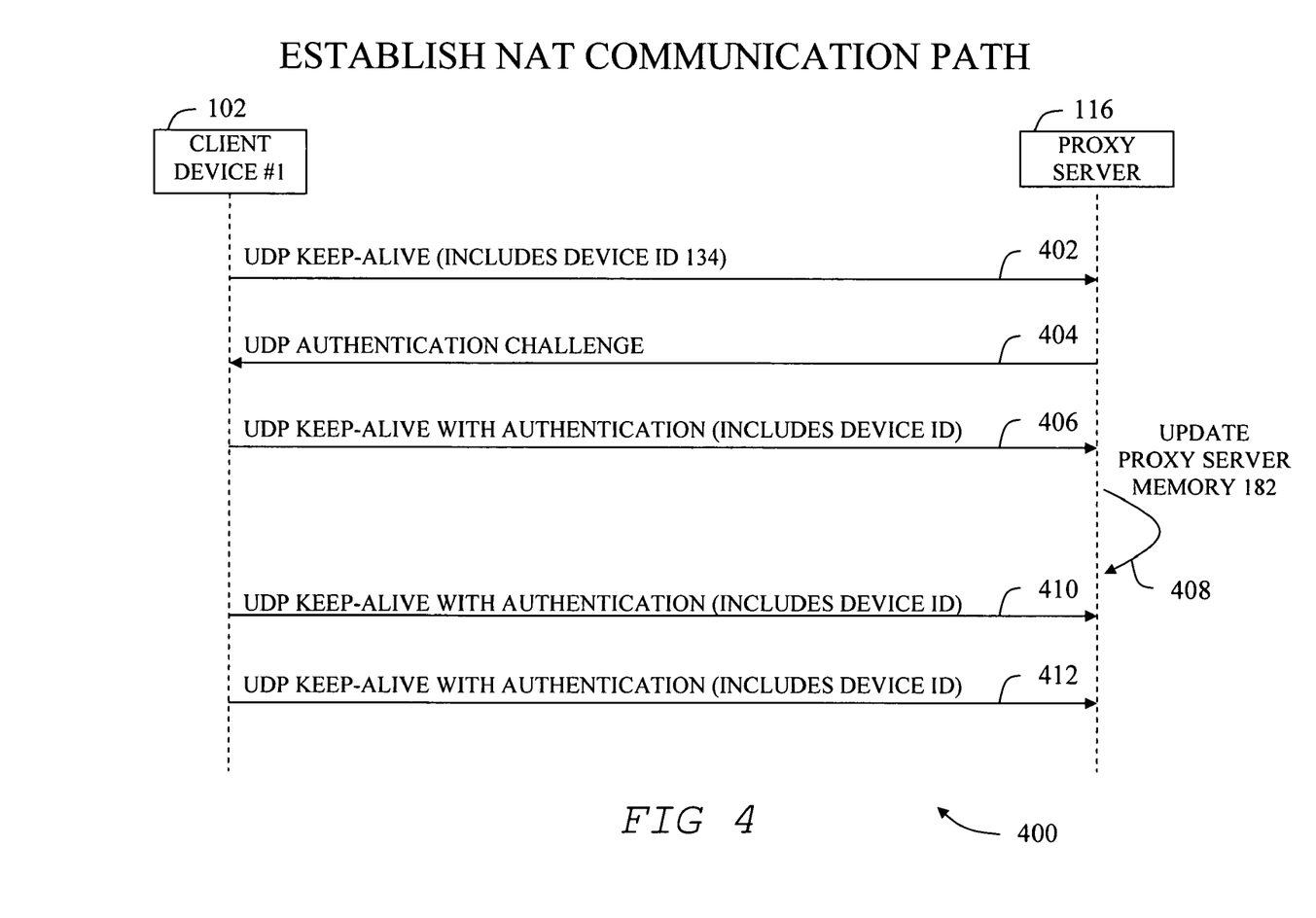
FIG. 4 shows an exemplary process flow for establishing a communication path between a gateway server and a client device, according to an embodiment of the present invention.

FIG. 4 shows an exemplary process flow 400 for establishing a communication path between a gateway and a client device, according to an embodiment of the present invention. Flow 400 includes the exchange of one or more message packets comprising a series of operations. Flow 400 begins with an operation 402 where device 102 asserts a UDP Keep-Alive message including client device identifier 134 to gateway 106 destined for proxy server 116. In one embodiment, client device 102 automatically establishes connectivity with the proxy server following boot. The network address, or location, of proxy server 116 can be discovered by client device 102 using some discovery protocol such as DHCP. Alternatively, the location of proxy server 116 may be configured on client device 102 by an Internet Service Provider (ISP) where the network address is either pre-loaded onto client device 102 during manufacture, or updated via a remote management protocol such as TR-069, referenced above. The frequency of keep-alive messages can similarly be configured in this manner. Alternatively, the device may discover an optimal message interval based on how quickly the NAT binding at the gateway expires. That is, how long does the gateway open up a NAT path to let the return messages from the remote entity pass through to the device.

Flow 400 continues with operation 404 where gateway 106 optionally responds to device 102 with a UDP authentication challenge. This message may also contain the source transport address as seen by the proxy server. This allows the Client Device to learn its current public transport address assigned by the gateway. Flow 400 continues with operation 406 where device 102 responds to the optional authentication challenge by asserting a UDP Keep-Alive message with authentication, including device identifier 134. Once proxy server 116 receives the authentication response, flow 400 continues with operation 408 where proxy server 116 validates the authentication and updates proxy memory 182 with the associated transport address 160-1 and device identifier 134-2. Thus, client device 102 establishes a network path to proxy server 116 that can optionally be secured (e.g. authenticated and encrypted) using a variety of mechanisms. Once proxy server memory 182 is updated, flow 400 continues with device 102 periodically sending UDP Keep-Alive messages (410, 412). The appropriate period between sending UDP Keep-Alive messages depends on the behavior of the NAT function in gateway 106. The appropriate period may be configured on client device 102, for example by an administrator, or client device 102 may dynamically discover the appropriate period by observing NAT binding expiration time of the NAT 154 in gateway 106. Flow 400 concludes when the NAT communication path is no longer needed and is disabled.

Figure 5:
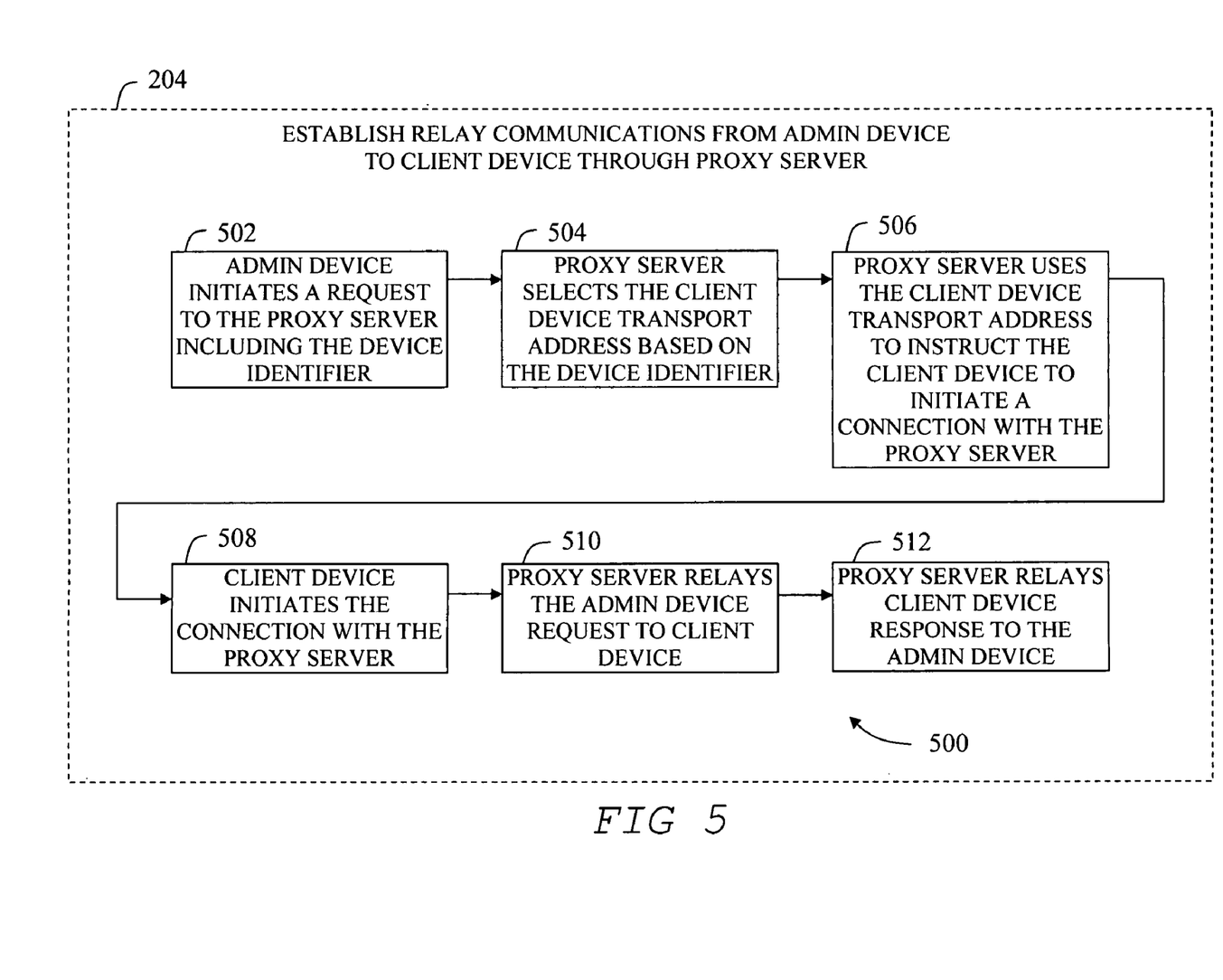
FIG. 5 shows a detailed exemplary process flow for establishing relay communications from an admin device to a client device through a proxy server, according to an embodiment of the present invention.

FIG. 5 shows a detailed exemplary process flow 500 for establishing relay communications from an admin device to a client device through a proxy server, according to an embodiment of the present invention. Flow 500 corresponds to at least one embodiment of operation 204 in FIG. 2. In reference to FIGS. 1, 2, and 6, flow 500 includes initiating a request from admin device 114 to proxy server 116 where the request includes device identifier 134 of device 102, in operation 502. Device identifier 134 indicates device 102 as the intended target for the established relay communications. Device identifier 134 may be included as a part of a URL, an HTTP header, or as HTTP payload or message body in the case of a HTTP POST operation. Flow 500 continues with proxy server 116 selecting the stored client device transport address 160 associated with client device identifier 134, in operation 504. Although device identifier may originate in device 102, both client device transport address 160-1 and device identifier 134-2 may be stored and associated with each other in proxy memory 182.

Flow 500 continues with proxy server 116 uses client device transport address 160-1 to instruct client device 102 to initiate a connection with proxy server 116 in operation 506.

Client device 102 initiates the connection with proxy server 116 in operation 508. This connection between client device 102 and proxy server 116 may conform to the Transport Control Protocol (TCP) and be capable of transporting messages comprising HyperText Transport Protocol (HTTP) traffic. Once the TCP communication paths are established with proxy server 116, flow 500 continues with proxy server 116 relaying the request from admin device 114 to client device 102 in operation 510. Flow 500 concludes with proxy server 116 relaying a response from client device 102 to admin device 114.

Figure 6:
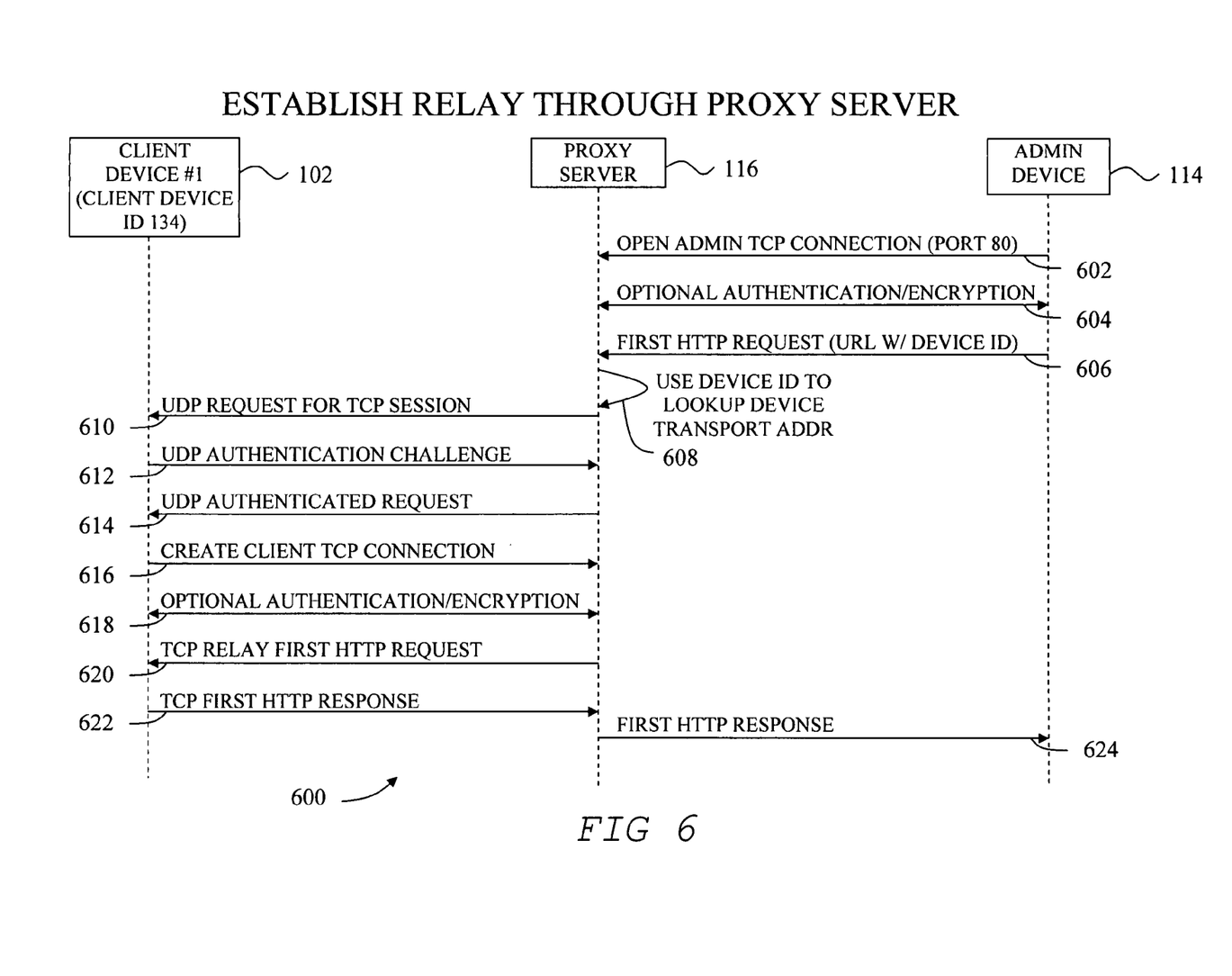
FIG. 6 shows an exemplary process flow for establishing relay communications through a proxy server, according to an embodiment of the present invention.

FIG. 6 shows an exemplary process flow 600 for establishing relay communications through proxy server 116, according to an embodiment of the present invention. Flow 600 begins with an operation 602 where admin device 114 opens a TCP connection with proxy server 116. For example, a web browser application running on admin device 114 may assert a HTTP message to proxy server 116 port 80. A port typically identifies a connection point in a protocol stack, a socket or a transport address identifies an IP address and a port number pair, and a socket pair identifies the source address and source port along with the destination address and destination port. The Open System Interconnection (OSI) reference model that defines a hierarchy of seven protocol layers can be termed a stack along with the set of TCP/IP protocols that define communications over a switched packet network such as Internet 110 and/or connected LAN 108.

Once proxy server 116 receives the request to open the TCP connection in operation 602, flow 600 optionally continues with proxy server 116 and admin device 114 mutually establishing the authenticity of each other and/or establishing encryption to guarantee privacy or data security during the requested TCP session in operation 604. A Transport Layer Security (TLS) protocol, for example, may be used to mutually authenticate the identity of admin 114 and proxy server 116 and/or encrypt the data portion of one or more message packets to prevent an unauthorized network device or user from accessing the message data. In this manner, operation 604 can allow authentication between proxy server 116 and client device 102 as well as allow the negotiation of an encryption algorithm and cryptographic keys before exchanging sensitive data.

Once the optional authentication and/or encryption is completed, flow 600 continues with admin 114 asserting a first HTTP request to proxy server 116 which may including a Uniform Resource Locator (URL) along with device identifier 134-1 for device 102 in operation 606. When proxy server 116 receives the first HTTP request, flow 600 continues with proxy server 116 searching proxy server memory 182 for device transport address 160-1 corresponding to the device identifier 134-2 of device 102 in operation 608. In one example of searching, the client device identifier 134-1 supplied by admin device 114 is compared with client device identifier 134-2 stored in proxy memory 182 to determine a match. If they match, then the associated client device transport address 160-1 allocated to client device 102 is retrieved from proxy memory 182 and used to access client device 102. A different device transport address is assigned each network device on LAN 108. Once proxy server 116 has located the record in proxy server memory 182 corresponding to device 102, proxy server 116 sends a UDP request to device 102 at the stored transport address with a request to establish a TCP session with proxy server 116 in operation 610. Once device 102 receives the UDP request for TCP session, device 102 optionally responds with a UDP authentication challenge in operation 612. Upon receiving the challenge, proxy server 116 responds to device 102 with an authenticated request in operation 614. Device 102 examines the authenticated request and responds by creating a client TCP connection or session with proxy server 116 in operation 616.

Once the private TCP connection is created in operation 616, flow 600 optionally continues with proxy server 116 and client device 102 mutually establishing the authenticity of each other and/or establishing encryption to guarantee privacy or data security during the requested TCP session in operation 618. Once both the admin TCP connection and the client TCP connections are established, proxy server 116 relays a version of the first HTTP request to device 102 in operation 620. In this case, the relayed first HTTP request of operation 620 does not need to include device identifier 134. Device 102 receives the first HTTP request and provides a first HTTP response over TCP in operation 622 conveying the response from device 102 to the first HTTP request from proxy server 116 in operation 606. Proxy server 116 may augment the response as necessary before relaying. For example, proxy server 116 may insert an HTTP instruction to Admin Device 114 web browser 174 to keep the TCP connection open or it may insert an HTTP cookie to identify the session. Proxy server 116 receives the first HTTP response over TCP from device 102 and relays that response in an operation 624 to admin device 114 as a response to the first HTTP request in operation 606. In this manner, a relay communication path through gateway 106 and proxy server 116 is established between client device 102 having a private address and admin device 114 on a separate network, where admin device 114 is not aware of the private address for client device 102. From this point on, proxy server 116 maintains two, separate TCP connections: one to client device 102 and one to admin device 114. Subsequent requests from the client may be relayed to the device and responses may be relayed back. Both TCP connections may be terminated for various reasons including an explicit indication from admin device 114 that the session is over, or after a period of inactivity.

Figure 7:
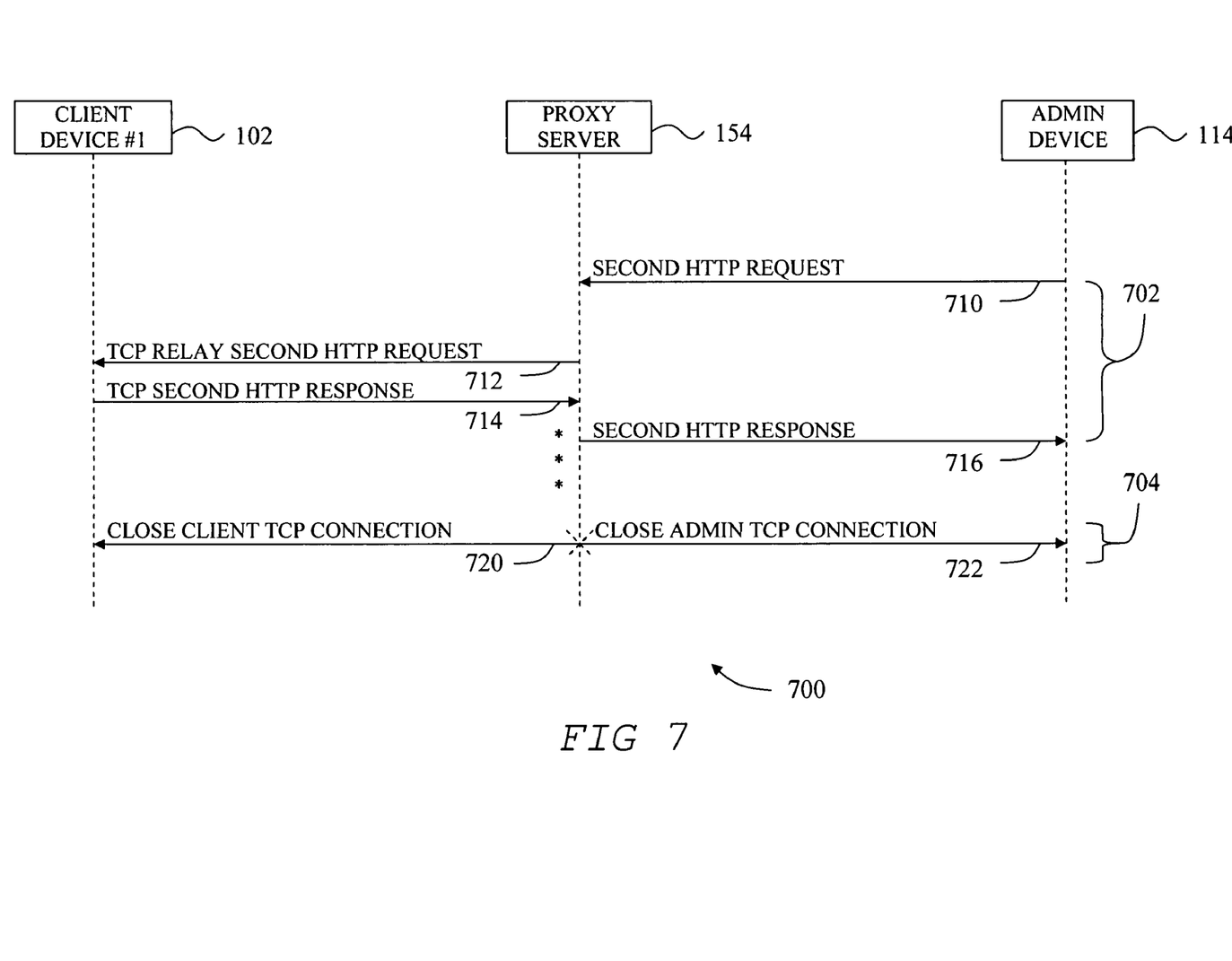
FIG. 7 shows an exemplary process flow for exchanging messages through a proxy server once a communications relay is established, according to an embodiment of the present invention.

FIG. 7 shows an exemplary process flow 700 for exchanging messages through proxy server 116 once a communications relay is established, according to an embodiment of the present invention. Flow 700 may include a flow 702 for exchanging messages where a admin device 114 initiates the transfer and a flow 704 where the communications relay is terminated following the end of all transfers. Flow 702 begins with an operation 710 where admin device 114 asserts a second HTTP request to proxy server 116. When proxy server 116 receives the second request in the same admin TCP connection or HTTP session, flow 702 continues with proxy server 116 relaying the HTTP request over an already established TCP connection with client device 102 in operation 712. Client device 102 receives the second request and determines a TCP second HTTP response that is asserted to proxy server 116 in operation 714. Proxy server 116 receives the TCP second HTTP response from device 102 and relays that response in operation 716 to admin device 114, as a response to the second HTTP request in operation 710. In this manner, a request message is exchanged through proxy server 116 where admin device 114 is the initiator and client device 102 is the responder in an exemplary flow 702.

Once all messages are passed between client device 102 and admin device 114, flow 700 concludes in operation 704 that closes the relay link through proxy server 116 between client device 102 and admin device 114. Specifically, operation 704 includes an operation 720 that closes the client TCP connection between client device 102 and proxy server 116 and an operation 722 that closes the admin TCP connection between proxy server 116 and admin device 114, both established in operation 600 as described in reference to FIG. 6.

Although the invention has been described with respect to particular embodiments, this description is only an example of the invention's application and should not be taken as a limitation. Consequently, the scope of the invention is set forth in the following claims.

We claim:

1. A proxy server, comprising:
a memory configured to store and retrieve a client device identifier and an associated client device public transport address; and
a communication unit, wherein:
the communication unit is configured to send and receive messages,
the communication unit is configured to receive an identification message according to a first protocol from a client device through at least one intermediate network address translator (NAT), wherein:
the identification message according to the first protocol includes the client device identifier and conveys the client device public transport address,
the communication unit is configured to receive keep-alive messages according to the first protocol periodically sent by the client device to maintain a NAT address binding;
the memory is updated with the conveyed client device public transport address so that the conveyed client device public transport address is associated in memory with the client device identifier;
the communication unit is configured to receive an HTTP request message from an admin device, the HTTP request message including the client device identifier and the HTTP request message being inbound initiated, and
the proxy server is configured to
search the memory for the client device identifier that matches the client device identifier included in the HTTP request message;
select the updated public transport address associated in memory with the client device identifier;
retrieve the associated client device public transport address;
instruct the client device via a message according to the first protocol, using the associated client device public transport address and the NAT address binding maintained using the keep-alive messages of the first protocol, to open a first connection with the proxy server according to a second protocol that is different from the first protocol;
relay the inbound initiated HTTP request message from the admin device via the connection according to the second protocol to the client device; and
relay an HTTP response message from the client device via a second connection to the admin device.

2. The proxy server of claim 1, wherein the first protocol is a connectionless protocol confoiming to a user datagram protocol (UDP).

3. The proxy server of claim 1, wherein the second protocol conforms to the transfer control protocol (TCP).

4. The proxy server of claim 1, wherein the proxy server is configured to relay messages comprising hypertext transfer protocol (HTTP) traffic between the client device and the admin device.

5. The proxy server of claim 4, wherein the client device permits remote administration by the admin device.

6. The proxy server of claim 4, wherein the client device permits remote troubleshooting through a client user interface.

7. The proxy server of claim 6, wherein the client user interface is a web browser application running on a client processor.

8. The proxy server of claim 1, wherein the proxy server is configured to respond to an authentication challenge from the client device.

9. The proxy server of claim 4,
wherein the admin device opens a first transfer control protocol (TCP) connection between the admin device and the proxy server, and
wherein the proxy server instructs the client device to open a second TCP connection between the client device and the proxy server.

10. The proxy server of claim 9, wherein the proxy server is configured to assert an authentication challenge to the admin device.

11. A proxy server, comprising:
means for storing and retrieving information including a client device identifier and an associated client device public transport address; and
means for communication including the sending and receiving of messages, wherein:
the communication means is configured to receive an identification message according to a first protocol from a client device through at least one intermediate network address translator (NAT), wherein:
the identification message according to the first protocol includes the client device identifier and conveys the client device public transport address,
the communication means is configured to receive keep-alive messages according to the first protocol periodically sent by the client device to maintain a NAT address binding,
the information storing and retrieving means is updated with the conveyed client device public transport address so that the conveyed client device public transport address is associated in a memory with the client device identifier,
the communication means is configured to receive an HTTP request message from an admin device, the HTTP request message including the client device identifier and the HTTP request message being inbound initiated, and
the proxy server is configured to
search the memory for the client device identifier that matches the client device identifier included in the HTTP request message;
select the updated public transport address associated in memory with the client device identifier;
retrieve the associated client device public transport address;
instruct the client device via a message according to the first protocol, using the associated client device public transport address and the NAT address binding maintained using the keep-alive messages of the first protocol, to open a first connection with the proxy server according to a second protocol that is different from the first protocol;
relay the inbound initiated HTTP request message from the admin device via the first connection according to the second protocol to the client device; and
relay an HTTP response message from the client device via a second connection to the admin device.

12. A client device, comprising:
a client device identifier; and
a communication unit configured to send and receive messages, wherein:
the client device is configured to send an identification message including the client device identifier and conveying an associated client device public transport address according to a first protocol to establish a path through at least one intermediate network address translator (NAT) to a proxy server,
the client device is configured to periodically send keep-alive messages to the proxy server according to the first protocol to maintain a NAT address binding,
the client device is configured to receive a request message from the proxy server according to the first protocol on the path established by the identification message according to the first protocol, wherein the proxy server:
updates a memory with the conveyed client device public transport address so that the conveyed client device public transport address is associated in memory with the client device identifier;
receives a first HTTP request message from an admin device, the first HTTP request message including the client device identifier and the first HTTP request message being inbound initiated;
searches the memory for the client device identifier that matches the client device identifier included in the first HTTP request message;
selects the updated public transport address associated in memory with the client device identifier;
retrieves the associated client device public transport address;
includes in the request message according to the first protocol, using the associated client device public transport address and the NAT address binding maintained using the keep-alive messages of the first protocol, a request to establish a first connection between the client device and the proxy server according to a second protocol that is different from the first protocol;
relays the inbound initiated HTTP request message from the admin device via the first connection according to the second protocol to the client device; and
relays an HTTP response message from the client device via a second connection to the admin device.

13. The client device of claim 12, wherein the client device identifier is stored in and retrieved from a memory.

14. The client device of claim 12, wherein the identification message is sent periodically to the proxy server in order to preserve a client device transport address allocation in each intermediate NAT.

15. The client device of claim 12, wherein the client device is configured to assert an authentication challenge to the proxy server.

16. The client device of claim 12, wherein each intermediate NAT resides in a gateway device providing isolation of a private network.

17. The client device of claim 12, wherein the first protocol is a connectionless protocol.

18. The client device of claim 17, wherein the first protocol conforms to a user datagram protocol (UDP).

19. The client device of claim 12, wherein the second protocol is the transfer control protocol (TCP).

20. The client device of claim 19, further comprising:
a client user interface configured to permit remote administration of the client device; and
a client processor configured to execute program instructions.

21. The client device of claim 20, wherein the client user interface is a web browser application running on the client processor, the client device being configured to receive and respond to messages comprising hypertext transfer protocol (HTTP) traffic.

22. The client device of claim 21, wherein admin device is configured to initiate a request for remote administration through an admin web browser to the client web browser, the client device web browser being configured to permit remote troubleshooting and configuration of the client device.

23. A client device, comprising:
  means for storing and retrieving information including a client device identifier; and
  means for communication including the sending and receiving of messages, wherein:
    the communication means is configured to send an identification message including the client device identifier and conveying an associated client device public transport address according to a first protocol through at least one intermediate network address translator (NAT) to a proxy server,
    the client device is configured to periodically send keep-alive messages to the proxy server according to the first protocol to maintain a NAT address binding,
    the client device is configured to receive a request message from the proxy server according to the first protocol on the path established by the identification message according to the first protocol,
    the first protocol is a connectionless protocol, and wherein the proxy server:
      updates a memory with the conveyed client device public transport address so that the conveyed client device public transport address is associated in memory with the client device identifier;
      receives a first HTTP request message from an admin device, the first HTTP request message including the client device identifier and the first HTTP request message being inbound initiated;
      searches the memory for the client device identifier that matches the client device identifier included in the first HTTP request message;
      selects the updated public transport address associated in memory with the client device identifier;
      retrieves the associated client device public transport address;
      includes in the request message according to the first protocol, using the associated client device public transport address and the NAT address binding maintained using the keep-alive messages of the first protocol, a request to establish a first connection between the client device and the proxy server according to a second protocol that is different from the first protocol;
      relays the inbound initiated HTTP request message from the admin device via the first connection according to the second protocol to the client device; and
      relays an HTTP response message from the client device via a second connection to the admin device.

24. An admin device, comprising:
  a memory configured to store and retrieve a client device identifier that provides for identification of a client device on a private network, wherein:
    the client device has an associated client device public transport address, and
    the client device maintains a communication path using a first protocol with a proxy server through at least one intermediate network address translator (NAT) wherein:
      the client device is configured to periodically send keep-alive messages to the proxy server according to the first protocol to maintain a NAT address binding; and
  a communication unit configured to send and receive messages, wherein:
    the admin device is configured to send a first HTTP request message including the client device identifier to the proxy server,
    the proxy server is configured to
      update a memory with the client device public transport address so that the client device public transport address is associated in memory with the client device identifier;
      receive the first HTTP request message from the admin device, the first HTTP request message including the client device identifier and the first HTTP request message being inbound initiated;
      use the client device identifier to search the memory for the client device identifier that matches the client device identifier included in the first HTTP request message;
      select the updated public transport address associated in memory with the client device identifier;
      retrieve the associated client device public transport address for the client device,
    the proxy server is configured to instruct the client device via a message according to the first protocol, using the associated client device public transport address and the NAT address binding maintained using the keep-alive messages of the first protocol, to establish a first connection with the proxy server using a second protocol that is different from the first protocol, and
    the proxy server is configured to provide a relay of messages between the client device and the admin device using the first connection, to relay the inbound initiated HTTP request message from the admin device via the first connection according to the second protocol to the client device; and to relay an HTTP response message from the client device via a second connection to the admin device.

25. The admin device of claim 24, further comprising:
  an admin user interface configured to permit remote administration of the client device including troubleshooting and configuration of the client device.

26. The admin device of claim 24, further comprising:
  an admin processor configured to execute program instructions,
  wherein the admin processor executes at least one of an autonomous client program, a diagnostic program, and a troubleshooting script adapted for use with the client device.

27. The admin device of claim 24, wherein the admin user interface is a web browser application running on the admin processor, the admin device being configured to receive and respond to messages comprising hypertext transfer protocol (HTTP) traffic.

28. A method of providing access to a client device, the method comprising the operations of:
  establishing a communication path between a client device and a proxy server through at least one intermediate network address translator (NAT) using a first protocol, wherein:
    the client device provides a client device identifier to the proxy server, and the client device is configured to periodically send keep-alive messages to the proxy server according to the first protocol to maintain a NAT address binding, wherein:

a client device public transport address is conveyed to the proxy server;

a memory is updated with the conveyed client device public transport address so that the conveyed client device public transport address is associated in memory with the client device identifier; and establishing relay communications between an admin device and the client device through the proxy server using a second protocol that is different from the first protocol, wherein:

the admin device provides the client device identifier to the proxy server, and the proxy server uses the client device identifier to search the memory for the client device identifier that matches the client device identifier provided to the proxy server from the client device;

select the updated public transport address associated in memory with the client device identifier;

retrieve the associated client device public transport address;

instruct the client device via a message according to the first protocol, using the associated client device public transport address and the NAT address binding maintained using the keep-alive messages of the first protocol, to open a first connection with the proxy server according to the second protocol to access the communication path between the client device and the proxy server;

relay an inbound initiated HTTP request message from the admin device via the first connection according to the second protocol to the client device; and relay an HTTP response message from the client device via a second connection to the admin device.

29. The method of claim 28, wherein the operation of establishing a communication path between a client device and a proxy server further comprises:

establishing a communication channel with the proxy server using an allocated client device transport address;

receiving at the proxy server the device identifier sent by the client device; and recording the client device identifier and the allocated client device transport address in the proxy server.

30. The method of claim 29, wherein each periodic message includes the client device identifier.

31. The method of claim 29, further comprising:
receiving an authentication challenge; and
responding to the authentication challenge with an authenticated request.

32. The method of claim 28, wherein the operation of establishing relay communications between an admin device and the client device through the proxy server further comprises:

asserting a first request from the admin device to the proxy server including the device identifier;

accessing the client device through the communication path between the client device and the proxy server;

instructing the client device to initiate a connection with the proxy server;

relaying the first request to the client device over the connection; and relaying a response from the client device to the admin device through the proxy server.

33. The method of claim 32, wherein the operation of accessing the client device through the communication path between the client device and the proxy server includes looking up an allocated client device transport address using the client device identifier.

34. The method of claim 32, further comprising:
opening a connection from the admin device to the proxy server.

35. The method of claim 34, wherein both the connection between the client device and the proxy server and the connection between the admin device and the proxy server conform to the transport control protocol (TCP).

36. The method of claim 34, wherein the connection between the client device and the proxy server and the connection between the admin device and the proxy server enable at least one of remote administration and troubleshooting of the client device from the admin device.

37. The method of claim 34, wherein both the connection between the client device and the proxy server and the connection between the admin device and the proxy server are configured to relay messages comprising hypertext transfer protocol (HTTP) traffic.

38. The method of claim 37, further comprising the operations of:

asserting a second HTTP request from the admin device to the proxy server, the second HTTP request including the client device identifier;

relaying the second request from the proxy server to the client device;

relaying a second response to the second request from the client device to the proxy server; and relaying the second response from the proxy server to the admin device.

39. The method of claim 32, further comprising the operations of:

terminating the connection between the client device and the proxy server; and terminating the connection between the admin device and the proxy server.

* * * * *